(12) United States Patent
Jayakar

(10) Patent No.: US 11,878,647 B2
(45) Date of Patent: Jan. 23, 2024

(54) OCCUPANT RESTRAINT SYSTEM

(71) Applicant: ZF Passive Safety Systems US Inc., Washington, MI (US)

(72) Inventor: Hylus Ranjit Raj Jayakar, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/137,690

(22) Filed: Dec. 30, 2020

(65) Prior Publication Data
US 2022/0203924 A1 Jun. 30, 2022

(51) Int. Cl.
| | |
|---|---|
| *B60R 21/231* | (2011.01) |
| *B60R 21/205* | (2011.01) |
| *B60R 21/203* | (2006.01) |
| *B60R 21/2338* | (2011.01) |
| *B60R 21/013* | (2006.01) |
| *B60R 21/26* | (2011.01) |
| *B60R 21/00* | (2006.01) |

(52) U.S. Cl.
CPC .......... *B60R 21/231* (2013.01); *B60R 21/013* (2013.01); *B60R 21/203* (2013.01); *B60R 21/205* (2013.01); *B60R 21/2338* (2013.01); *B60R 21/23138* (2013.01); *B60R 21/26* (2013.01); *B60R 2021/0009* (2013.01); *B60R 2021/23382* (2013.01); *B60R 2021/23384* (2013.01)

(58) Field of Classification Search
CPC ... B60R 21/231; B60R 21/205; B60R 21/203; B60R 21/2338; B60R 21/013; B60R 21/206; B60R 21/214; B60R 21/23138; B60R 21/213; B60R 2021/0048; B60R 2021/0004; B60R 2021/0009; B60R 2021/0044; B60R 2021/0051; B60R 2021/0053; B60R 2021/0023; B60R 2021/0025; B60R 2021/23169; B60R 2021/23192; B60R 2021/23382
USPC .................................. 280/732, 743.1, 743.2
See application file for complete search history.

(56) References Cited

U.S. PATENT DOCUMENTS

| | | | |
|---|---|---|---|
| 5,486,019 A * | 1/1996 | Chevroulet | B60R 21/231 |
| | | | 280/743.1 |
| 7,000,943 B2 * | 2/2006 | Hasebe | B60R 21/233 |
| | | | 280/743.2 |
| 9,676,355 B2 | 1/2017 | Kruse | |
| 9,561,774 B2 * | 2/2017 | Cheng | B60R 21/239 |
| 9,956,937 B2 | 5/2018 | Jindal et al. | |
| 2017/0320460 A1 * | 11/2017 | Roychoudhury | B60R 21/233 |
| 2017/0355345 A1 | 12/2017 | Moritani et al. | |
| 2018/0215338 A1 * | 8/2018 | Faruque | B60R 21/237 |
| 2019/0016291 A1 * | 1/2019 | Paxton | B60R 21/2338 |

* cited by examiner

Primary Examiner — Keith J Frisby
(74) Attorney, Agent, or Firm — TAROLLI, SUNDHEIM, COVELL & TUMMINO L.L.P.

(57) ABSTRACT

A restraint system is provided for helping to protect an occupant in a seat of a vehicle and includes an airbag having a main portion inflatable from a stored condition to a deployed condition in front of the occupant. Arms extend from the main portion and are spaced apart from one another to form an uninflated volume for receiving the occupant in response to a vehicle collision. The arms are configured to inflate to opposite sides of the occupant prior to occupant penetration into the airbag.

24 Claims, 7 Drawing Sheets

OCCUPANT RESTRAINT SYSTEM

TECHNICAL FIELD

The invention relates to an inflatable vehicle occupant protection device for helping to protect an occupant of a vehicle.

BACKGROUND OF THE INVENTION

It is known to provide an inflatable vehicle occupant protection device, such as an airbag, for helping to protect an occupant of a vehicle. Airbags are deployable in response to the occurrence of an event for which occupant protection is desired, such as an impact to the vehicle, a vehicle rollover, or a combination thereof.

Upon sensing the occurrence of an event for which inflation of the airbag is desired, such as a vehicle collision, a sensor provides a signal to the inflator. The inflator, in response to the signal, is actuated and provides inflation fluid to the airbag in a known manner. The inflating airbag exerts a force that ruptures, tears, displaces, or otherwise opens the concealing structure (e.g., steering wheel, instrument panel, headliner, trim pieces, padding, upholstery), and the airbag inflates toward a fully inflated and deployed condition The airbag, while in this inflated and deployed condition, helps protect the vehicle occupant from impacts, such as with parts of the vehicle.

In development and testing of vehicle safety systems, manufacturers and safety authorities rely on statistical models and data to help quantify performance criteria and measure system performance. In doing so, reference is made to statistical vehicle occupants that represent the physical characteristics of vehicle occupants for which vehicle safety systems are meant to protect. Different occupant and/or vehicle scenarios are also taken into consideration.

One scenario for which manufacturers of vehicle safety systems can design those systems to account for is referred to as an out-of-position (OOP) occupant. OOP performance of a vehicle safety system refers to how that system responds to an occupant being positioned away from the normally seated position at the time of deployment. In regard to vehicle airbags, OOP performance refers to the performance of the airbag when the occupant is positioned away from the normally seated position at the time of airbag deployment. OOP performance can be important because an OOP occupant may be positioned closer (i.e., closer than a normally seated occupant) to the area of the vehicle from which the airbag deploys.

Vehicle occupants can have a variety of OOP positions. For example, an OOP occupant could be leaned forward at the time of deployment, which may be the case, for example, when the occupant is retrieving an item (purse, etc.) from the vehicle foot well. As another example, an occupant could be leaning against the side of the vehicle, which may be the case where the occupant is sleeping. As a further example, an occupant could be turned sideways and have his or her back positioned against the side structure of the vehicle, which may be the case, for example, where the occupant is turned to face and converse with others in the vehicle or attending to a child.

SUMMARY OF THE INVENTION

In one example, a restraint system is provided for helping to protect an occupant in a seat of a vehicle and includes an airbag having a main portion inflatable from a stored condition to a deployed condition in front of the occupant. Arms extend from the main portion and are spaced apart from one another to form an uninflated volume for receiving the occupant in response to a vehicle collision. The arms are configured to inflate to opposite sides of the occupant prior to occupant penetration into the airbag.

In another example, a restraint system for helping to protect an occupant in a seat of a vehicle includes a main portion inflatable from a stored condition to a deployed condition in front of the occupant. Arms extend from the main portion and are spaced apart from one another to form an uninflated volume for receiving the occupant in response to a vehicle collision. The arms have a depth in a forward-rearward direction of the vehicle greater than a depth of the main portion. At least one of the arms is configured to utilize vehicle structure as a reaction surface for restraining the movement of the airbag in response to occupant penetration into the airbag. At least one tether is provided in each arm.

In another aspect, taken alone or in combination with any other aspect, the arms have a depth in a forward-rearward direction of the vehicle greater than a depth of the main portion.

In another aspect, taken alone or in combination with any other aspect, the arms are inclined in a forward-rearward direction of the vehicle.

In another aspect, taken alone or in combination with any other aspect, the arms are angled at least about 90° from one another in an inboard-outboard direction of the vehicle.

In another aspect, taken alone or in combination with any other aspect, the main portion deploys from a steering wheel of the vehicle.

In another aspect, taken alone or in combination with any other aspect, the main portion deploys from an instrument panel of the vehicle.

In another aspect, taken alone or in combination with any other aspect, at least one of the arms is configured to utilize vehicle structure as a reaction surface for restraining the movement of the airbag in response to occupant penetration into the airbag.

In another aspect, taken alone or in combination with any other aspect, the vehicle structure is a door.

In another aspect, taken alone or in combination with any other aspect, the vehicle structure is a seat.

In another aspect, taken alone or in combination with any other aspect, a sensor is provided for sensing the occurrence of an event for which deployment of the airbag is desired and producing a signal indicative thereof. A controller is connected to the sensor and, in response to receiving the signal, actuates an inflator to inflate the airbag to the deployed condition.

DETAILED DESCRIPTION

Figure 1:
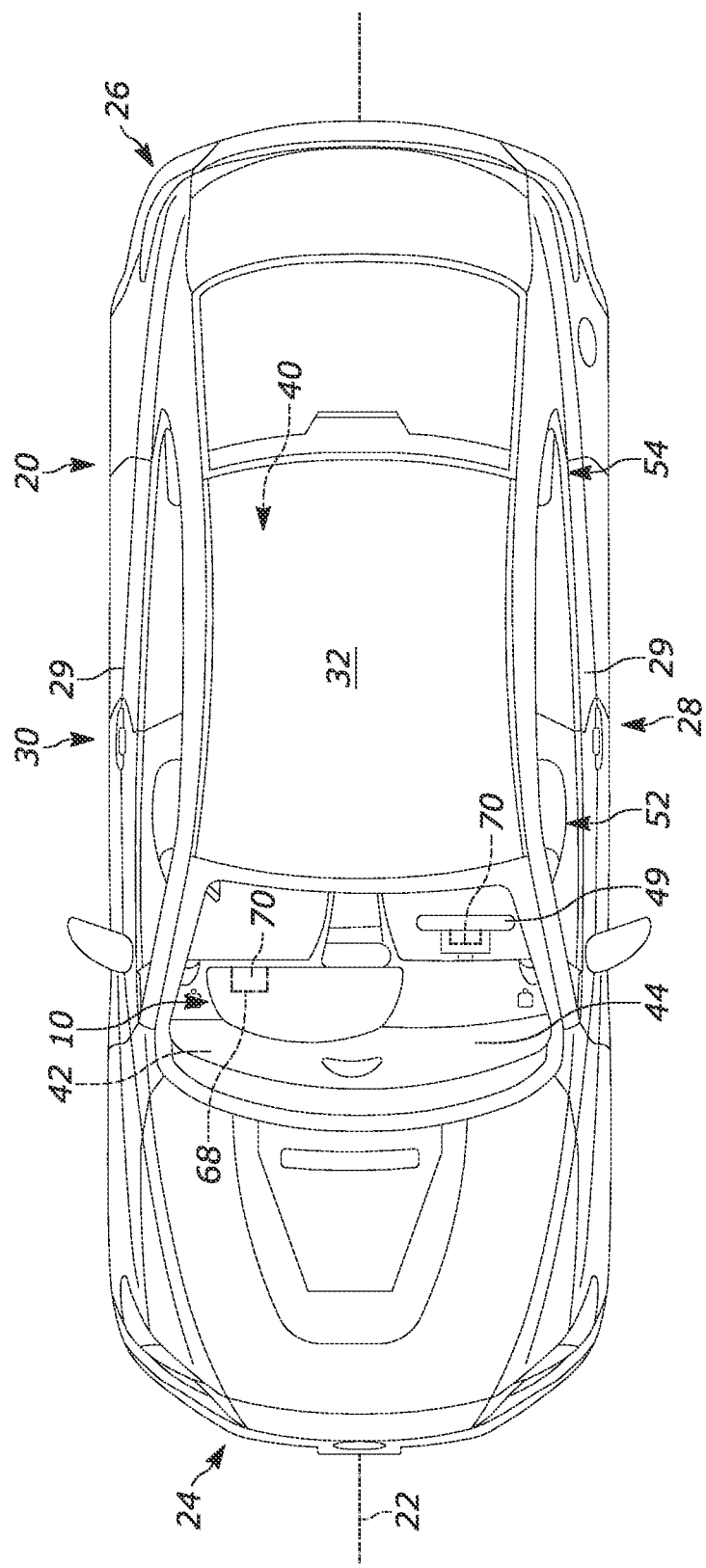
FIG. 1 is a top view of a vehicle including an example occupant restraint system.
Figure 2:
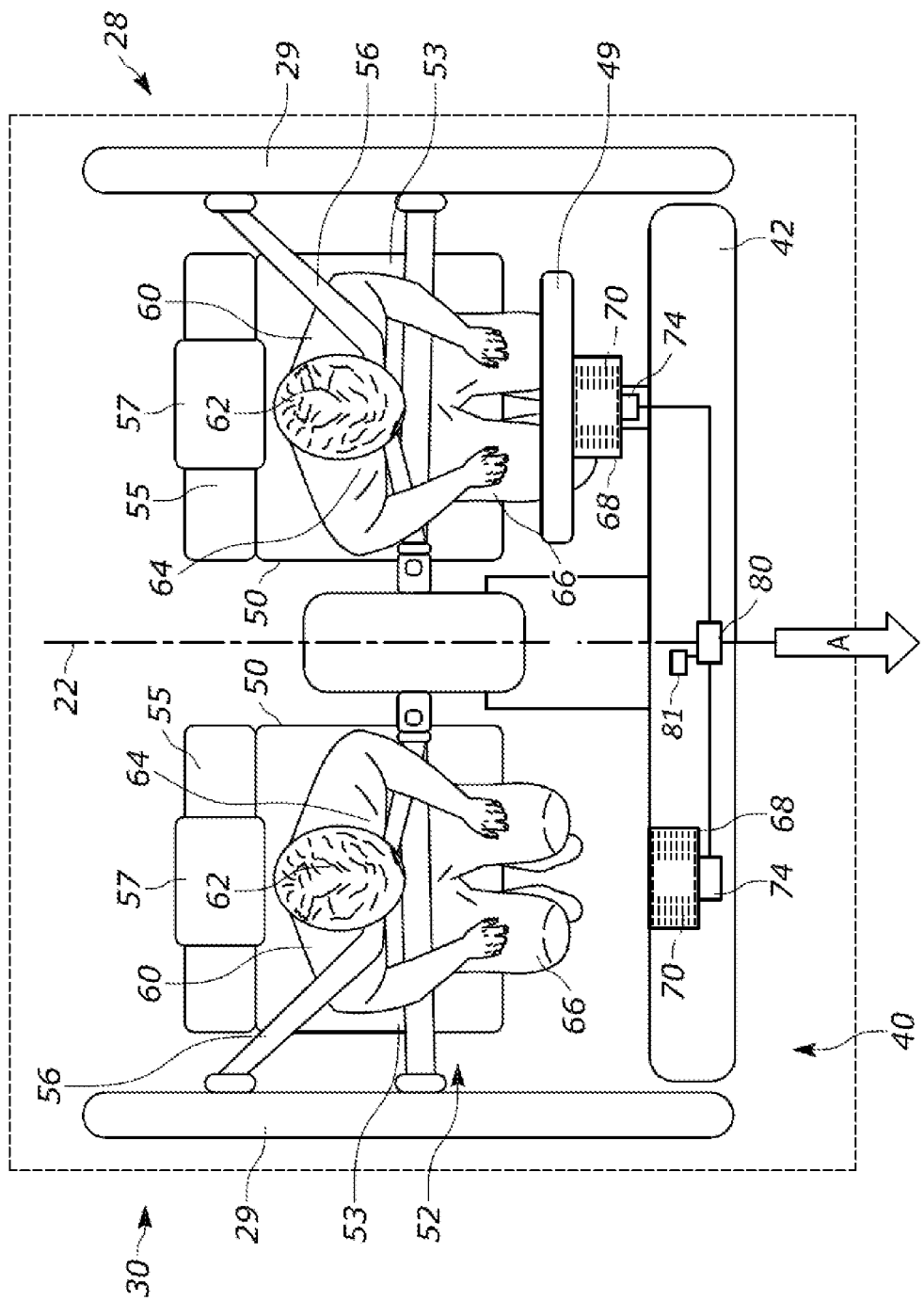
FIG. 2 is a top view of an interior of the vehicle.

The present invention relates generally to vehicle airbag and, in particular, relates to airbag providing frontal and side protection for vehicle occupants. FIGS. 1-6 illustrate an example vehicle safety system in the form of an occupant restraint system 10. Referring to FIGS. 1-2, the vehicle 20 extends along a centerline 22 from a first or fore end 24 to a second or aft end 26. The vehicle 20 extends to a left side 28 and a right side 30 on opposite sides of the centerline 22. Each side 28, 30 includes side structure 29 including an A-pillar, a B-pillar, a C-pillar, and doors connected to the pillars.

The first end 24 of the vehicle 20 includes an instrument panel 42 facing a passenger compartment or cabin 40. A windshield or windscreen 44 is located between the instrument panel 42 and a roof 32. The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40. In the example shown, a steering wheel 49 extends from the instrument panel 42.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

Each seat 50 includes a base or bottom 53 for receiving the legs 66 of the occupant 60. A seat back 55 extends from the base 53 towards the roof 32 and receives the upper torso 64 of the occupant 60. A headrest 57 is connected to the seat back 55 and receives the head 62 of the occupant 60.

The occupant restraint system 10 shown in FIGS. 1-2 include vehicle occupant protection devices in the form of inflatable airbags 70 mounted in the instrument panel 42 and/or steering wheel 49 of the vehicle 20 and associated with each seat 50 in the front row 52. Although the airbags 70 in the instrument panel 42 and steering wheel 49 are similar the construction and operation of only the airbag in the instrument panel and associated with the passenger seat 50 is discussed for brevity.

The airbag 70 is at least one of rolled or folded before being placed in the instrument panel 42, e.g., in the front of the instrumental panel facing rearward in the vehicle 20. The rolled airbag 70 can each be provided in a cover or housing/module 68 that is then placed in instrument panel 42. The module 68 also includes an inflator 74 for providing inflation fluid to the respective airbag 70. The inflator 74 is operatively connected (e.g., by wires) to an airbag controller 80 (see FIG. 2) that includes or communicates with one or more crash sensors 81. The airbag controller 80 is operative to determine the occurrence of a crash event and to actuate the inflator 74 in a known manner to inflate the airbag. The inflator 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

Figure 3:
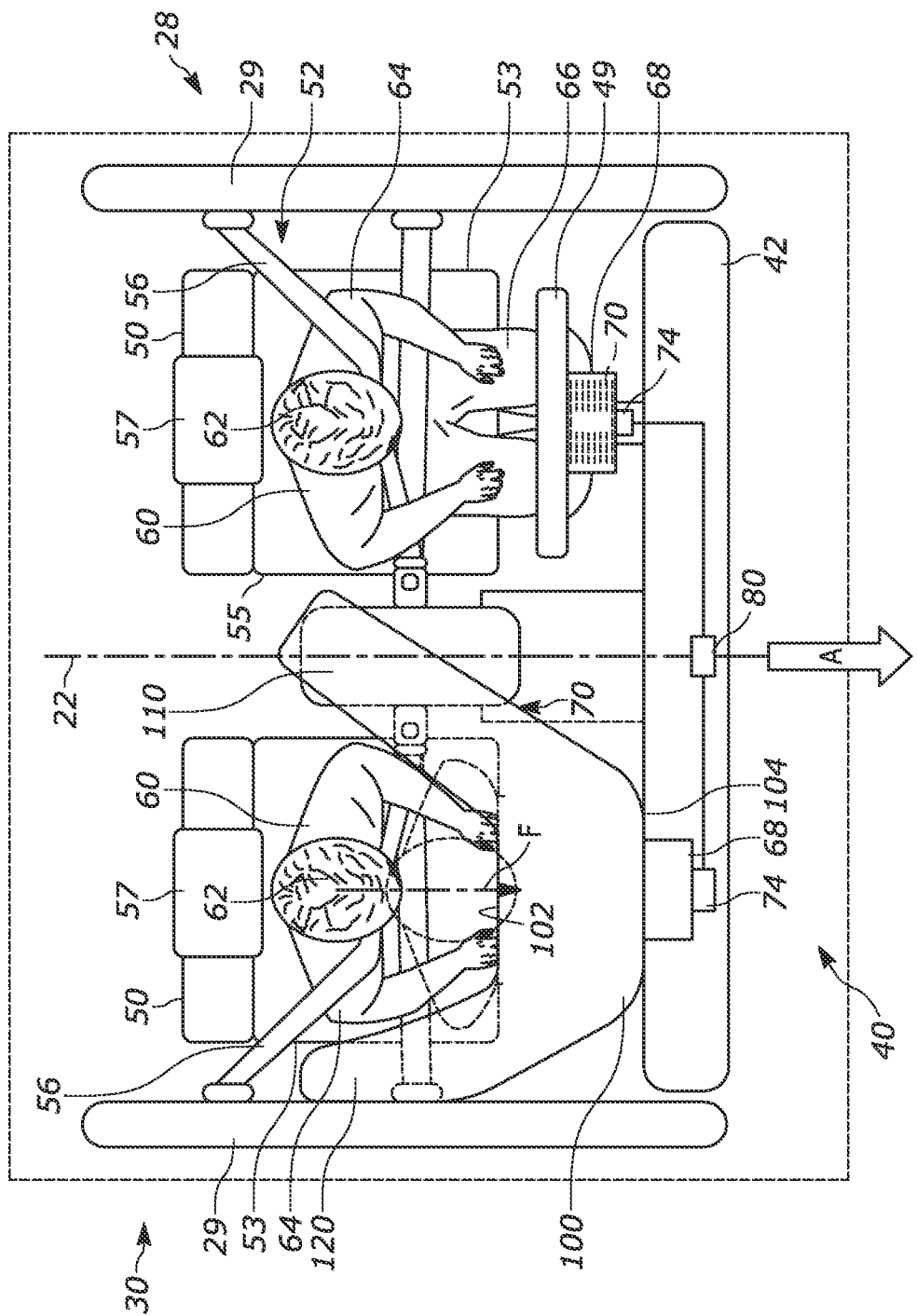
FIG. 3 is a top view of the interior of the vehicle of FIG. 2 during a frontal vehicle crash with an example airbag of the occupant restraint system in a deployed condition.

Upon sensing the occurrence of an event for which inflation of the airbag 70 is desired, such as a frontal vehicle collision, the controller 80 provides signals to the inflator 74 (see FIG. 3). Upon receiving the signals from the controller 80, the inflator 74 is actuated and provides inflation fluid to the inflatable volume of the airbag 70 in a known manner. The inflating airbag 70 exerts a force on the instrument panel 42, which causes the instrument panel to open (e.g., via tear seam or door). This releases the airbag 70 to inflate and deploy from a stored condition behind the instrument panel to a deployed condition extending into the cabin 40 both in front of and on opposite sides of the occupant 60. The airbag 70, while inflated, helps protect the vehicle occupant 60 in the seat 50 by absorbing the impact of the occupant.

The shape/configuration of the airbag 70 can be selected to coincide with anatomical features of an occupant 60 selected as a statistical representative of the population. For example, the airbag 70 can be configured to accommodate a $50^{th}$ percentile (50%) male, meaning that the occupant for which the airbag is modeled is a male that is larger than 50% of the male population. Other occupants for which the airbag 70 can be configured are a larger occupant, such as a 75% male, a very large occupant, such as a 95% male, or a small female, such as a 5% female. Sizes within these bounds can also be selected.

Additionally, in protection device parlance, the occupant can be seated in what is referred to herein as a "normal" or "normally" seated position. By this, it is meant that the occupant 60 is seated on the seat 50 with his or her buttocks on the seat base 53, facing forward, with his or her back resting against or near the seat back 55 and head 62 adjacent or near the headrest 57.

That said, the occupant 60 can alternatively be seated away from the normal seating position—previously referred to as an out of opposition ("OOP") occupant. With this in mind, the airbag 70 shown and described herein is advantageously configured to help protect occupants falling within predetermined statistical representations of the population and being seated normally or out of position when a frontal, side or oblique vehicle crash occurs.

Figure 4A:
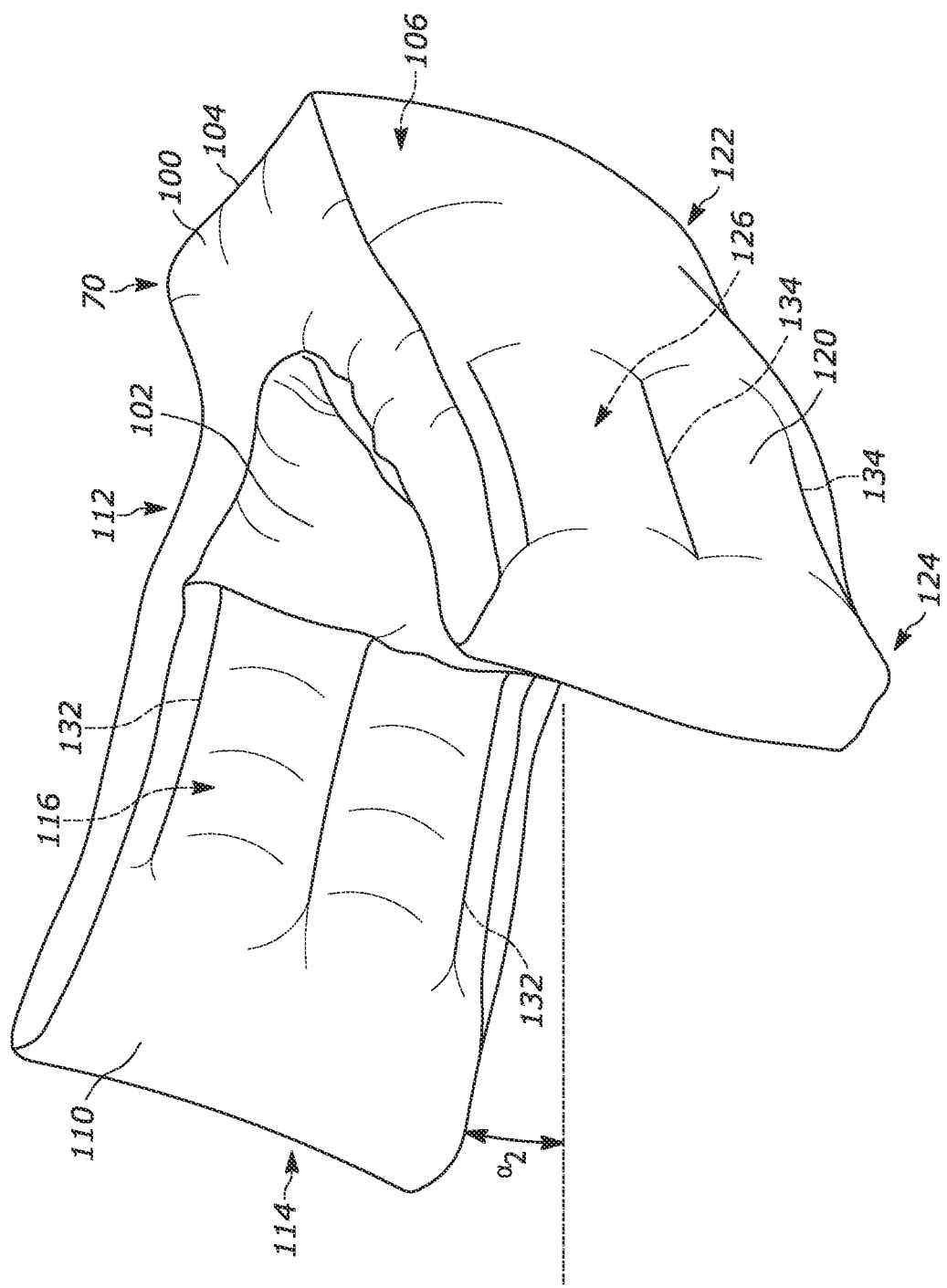
FIG. 4A is a side view of the airbag of FIG. 3.
Figure 4B:
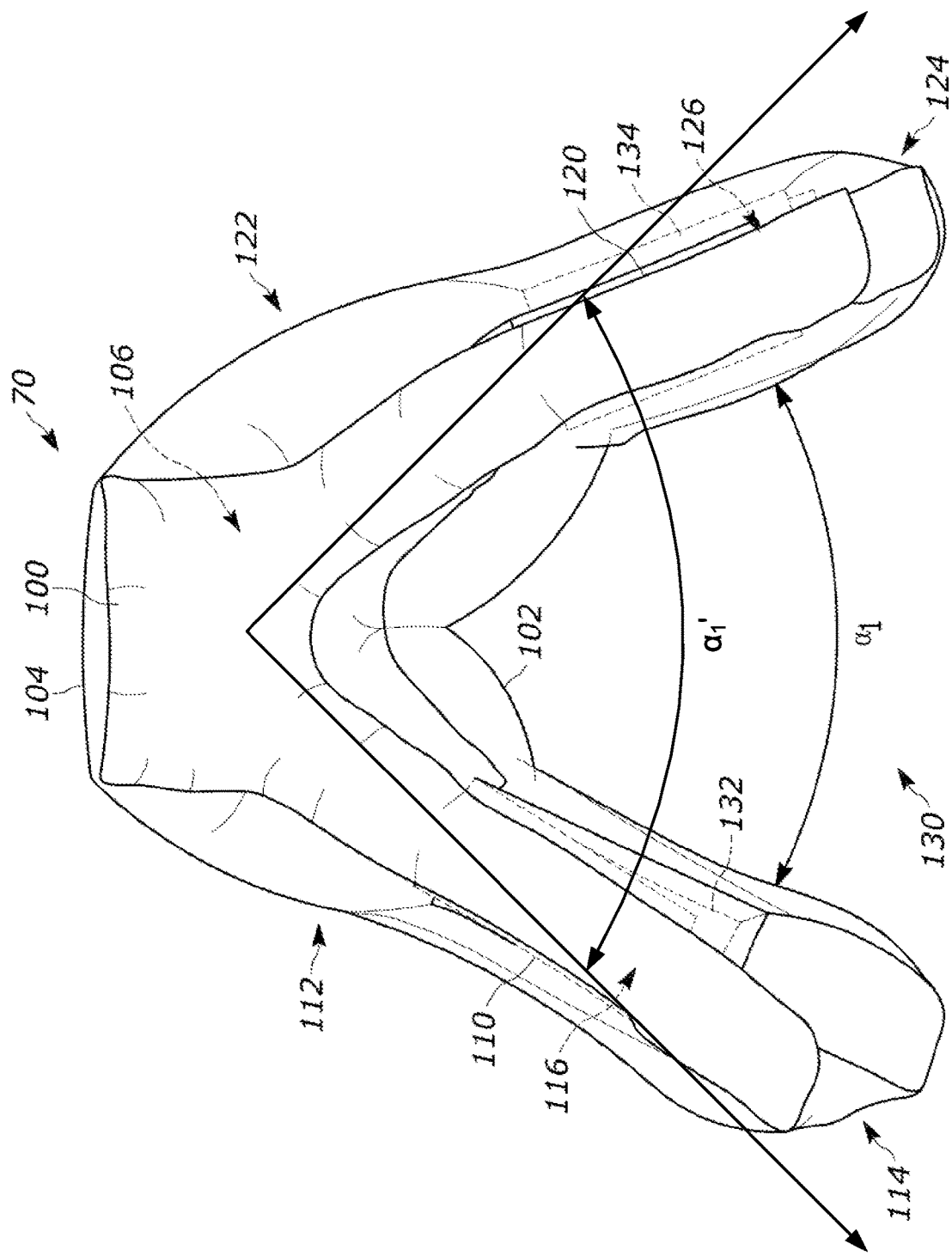
FIG. 4B is a top view of the airbag of FIG. 3.

Referring further to FIGS. 4A-4B, the airbag 70 includes a main portion 100 and a pair of projections or arms 110, 120 extending from the main portion. The main portion 100 is connected to the module 68 and fluidly connected to the inflator 74. The main portion 100 therefore extends into and is connected with the instrument panel 42. The main portion 100 includes a front or occupant facing panel 102 and a rear panel 104 facing away from the occupant 60, i.e., facing toward the instrument panel 42. The panels 102, 104 cooperate to help define an inflatable volume 106 for receiving inflation fluid from the inflator 74. The main portion 100, when inflated and deployed, is aligned with the seat 50 in the forward-rearward direction and therefore aligned with the occupant 60 in the seat.

The arms 110, 120 extend from the main portion 100 in a rearward direction of the vehicle 20. In one example, the arms 110, 120 extend at an angle β1 away from one another and, thus, the airbag 70 is substantially v-shaped. In one example, the angle β1 can be about 90°, as indicated generally at β1'. Greater and lesser angles are also contemplated. In any case, the arms 110, 120 and main portion 100 cooperate to define an uninflated volume or pocket 130 therebetween. The arms 110, 120 can be symmetrically or asymmetrically arranged about the main portion 100. The arms 110, 120 can be identical or different from one another.

The arm 110 extends rearward and inboard of the occupant 60 from a first end 112 connected to the main portion 100 to a second end 114 positioned proximate to the seat back 55 so that the arm 110 extends over the seat base 53 to above the intersection of the seat base and seat back. The arm 110 defines an inflatable volume 116 in fluid communication with the inflatable volume 106 of the main portion 100. The arm 120 extends rearward and outboard of the occupant 60 from a first end 122 connected to the main portion 100 to a second end 124 positioned proximate to the seat back 55 so that the arm 110 extends over the seat base 53 to above the intersection of the seat base and seat back. The arm 120 defines an inflatable volume 126 in fluid communication with the inflatable volumes 106, 116. The arms 110, 120 have a depth in the forward-rearward direction greater than the depth of the main portion 100 and a height that extends from just above the seat base 53 up to above the seat back 55 proximate the vehicle roof 32, thus covering the occupant's torso 64.

Figure 5:
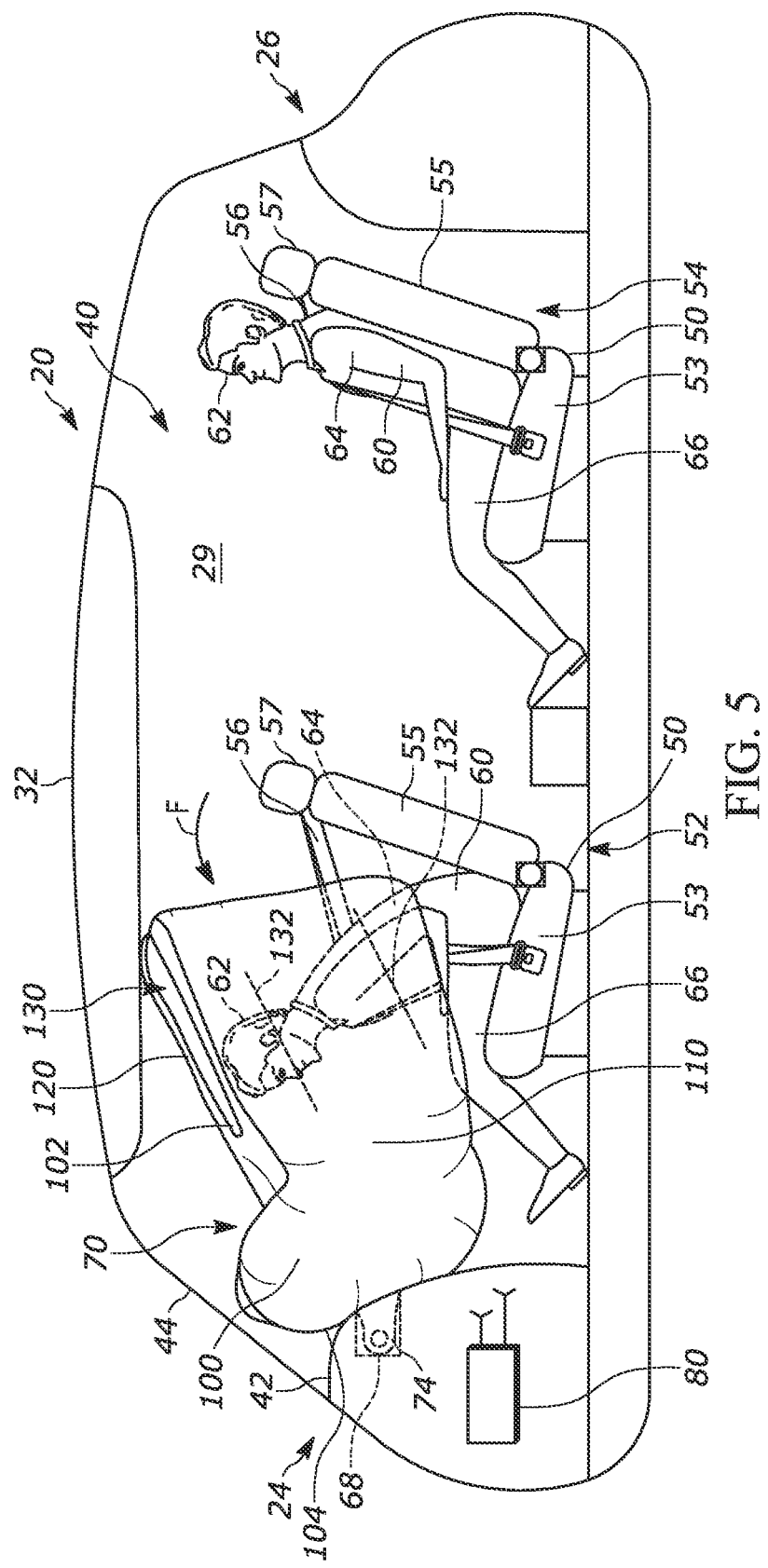
FIG. 5 is a side view of the interior of the vehicle of FIG. 3.

The arms 110, 120 can extend at an angle $\alpha_2$ relative to the forward-rearward direction of the vehicle so as to be inclined, i.e., angled upwards towards the roof 32 in a direction extending towards the rear end 26 of the vehicle 20 (see FIG. 5). Alternatively, the angle $\alpha_2$ can be zero (not shown).

The arms 110, 120 can be provided with additional structure for helping to control the inflation and deployment of the arms and to increase the stiffness thereof. As shown, tethers 132 are provided within the arm 110 and secured thereto along their perimeter by stitching, welding, etc. The tethers 132 are generally rectangular and extend substantially parallel to one another. The tethers 132 span the width of the arm 110 and can be stacked vertically therein.

Tethers 134 are provided within the arm 120 and secured thereto along their perimeter by stitching, welding, etc. The tethers 134 are generally rectangular and extend substantially parallel to one another. The tethers 134 span the width of the arm 120 and can be stacked vertically therein. Each arm 110, 120 can be provided with more or fewer respective tethers 132, 134 than shown, including zero tethers.

As shown in FIGS. 3 and 5, the vehicle 20 moves in the direction of travel indicated generally by the arrow A. Since the occupant 60 is belted, a frontal crash resulting in forward occupant 60 movement causes the occupant to bend at the waist and follow an angled or arcuate path as indicated generally by the arrow F toward the main portion 100 of the airbag 70. Characteristic of this angled/arcuate path F, the occupant 60 movement has both forward (i.e., away from the seat back 55) and downward (i.e., towards the instrument panel 42) components.

Advantageously, the main portion 100, which is aligned with the seat 50 in the forward-rearward direction, relies on the instrument panel 42 to provide a reaction force to the penetrating occupant 60. To this end, the rear panel 104 abuts the instrument panel 42 when the main portion 100 is inflated and thereby helps the main portion resist forward movement in response to occupant 60 penetration. This allows the main portion 100 to reduce loads on the moving occupant 60 by providing a desired ride-down effect thereon. More specifically, the ride-down effect afforded by the main portion 100 accommodates the forward moving occupant 60 by cushioning, thereby providing a more gradual deceleration of the penetrating occupant in the forward direction.

As a result, the occupant 60 moves in the direction F into the uninflated volume 130 between the arms 110, 120 and ultimately engages the panel 102. As the occupant 60 thereafter penetrates the main portion 100 the instrument panel 42 provides a reaction surface such that impacts between the penetrating occupant and airbag 70 are reduced.

Figure 6:
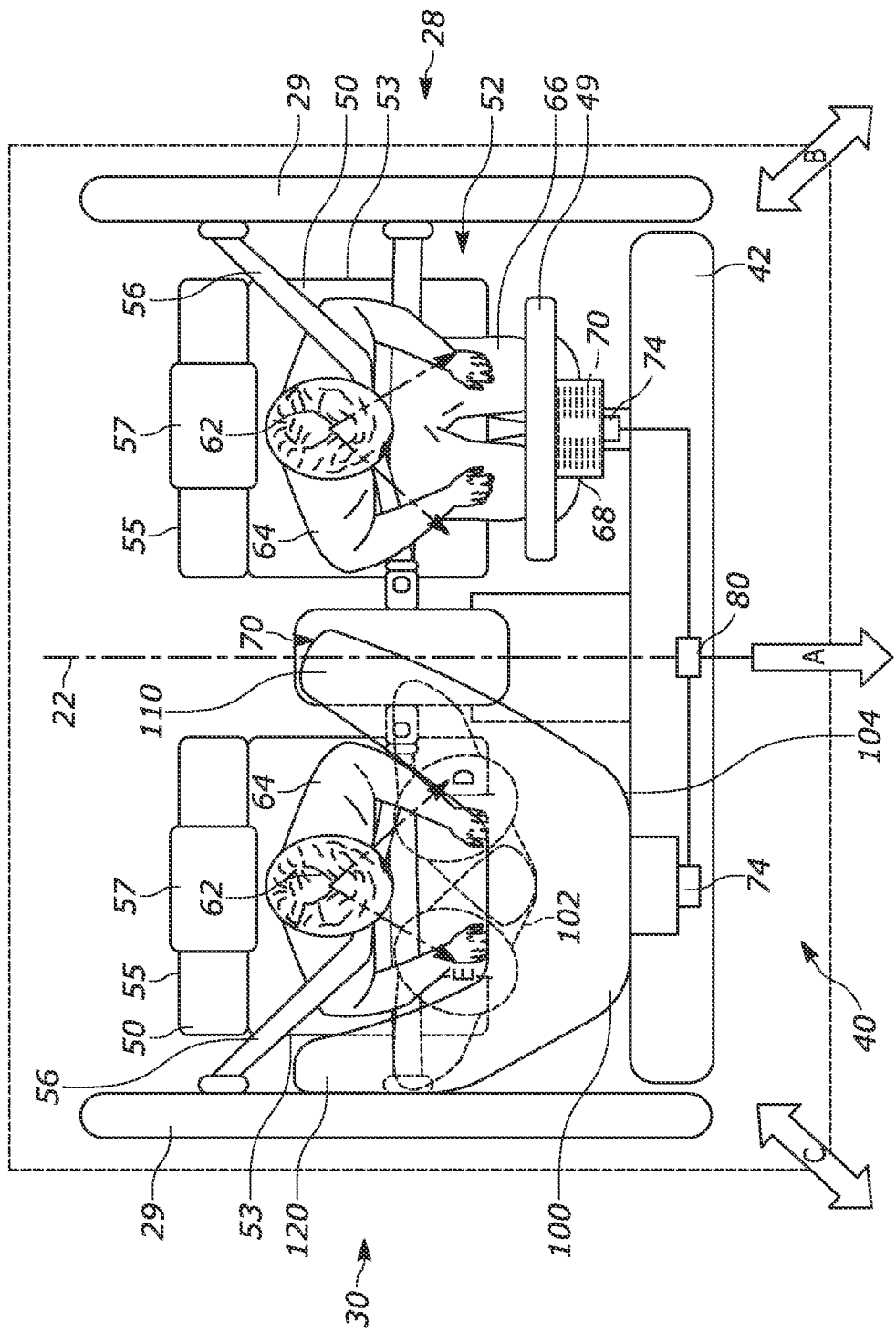
FIG. 6 is a top view of the interior of the vehicle of FIG. 2 during an oblique crash with the airbag in the deployed condition.

In another example shown in FIG. 6, the occupant 60 can move in on oblique manner towards the deployed airbag 70 (i.e., at angle relative to the centerline 22) in response to an oblique impact and/or when sitting in the seat 50 in an offset or angled manner. An oblique impact is meant to refer to scenarios where the impact results in the occupant 60 moving obliquely forward in the vehicle 20 in a direction that is non-parallel to the vehicle centerline 22 and the direction of forward vehicle travel (see arrow A).

For example, a left oblique impact can occur on the left side 28 of the vehicle 20 in response to, for example, the vehicle skidding at an angle into another vehicle or barrier, or in response to being struck by another vehicle moving at an angle. The left oblique impact is illustrated generally by the double arrow labeled B. Similarly, a right oblique impact can occur on the right side 30 of the vehicle 20 in response to, for example, the vehicle skidding at an angle into another vehicle or barrier, or in response to being struck by another vehicle moving at an angle. The right oblique impact is illustrated generally by the double arrow labeled C.

In the event of an oblique impact, the occupant 60 moves forward in the vehicle 20 in a direction that is angled either leftward towards the left side 28 of the vehicle 20 or rightward towards the right side 30 of the vehicle. A left oblique impact B causes the occupant 60 to move forward-leftward in the respective direction D toward the position indicated generally in dashed lines. Conversely, in the event of a right oblique impact C, the occupant 60 moves forward-rightward in the respective direction E toward the position indicated generally in dashed lines.

Of course, the oblique directions in which the occupant 60 moves, and his/her resulting position, can vary depending on the particulars of the impact event, such as the angle and/or velocity at which the vehicle 20 impacts another vehicle or object. Therefore, the oblique outboard and inboard directions of occupant 60 movement indicated by the respective arrows D, E, and the resulting respective position of each occupant, is by way of example only.

The degree to which the main portion 100 of the airbag 70 can help protect the occupant 60 in an oblique impact depends on the degree to which occupant movement deviates from the forward direction (i.e., the angle between arrows A and D or between arrows A and E). As the degree to which occupant 60 movement deviates from the forward direction (i.e., as the angle increases) the ability of the main portion 100 alone to help protect the occupant when deploying in the manner shown in FIG. 6 also decreases. Thus, as the occupant's movement becomes increasingly oblique, the ability of the main portion 100 alone to help protect the occupant 60 decreases.

With this in mind, the arms 110, 120 on the airbag 70 are advantageously configured to help receive the obliquely moving occupant 60. In particular, both the forward-rearward depth of the arms 110, 120 and the angle $\alpha_1$ therebetween help to accommodate a wide range of oblique occupant 60 movement during vehicle crashes—including movement of an OOP occupant that experiences an oblique vehicle crash.

To this end, the arm 110 extends to a position inboard of the occupant and rearward in the vehicle 20 sufficient to help protect the occupant in response to any degree of inboard movement in the direction D. The arm 110 can extend rearward to a position aligned with the occupant's upper torso 64 and/or aligned with the seat back 55. The arm 110 can also rely on, for example, the adjacent seat 50 in the front row 52 and/or any occupant in that seat as a reaction surface. More specifically, the deploying arm 110 can engage the adjacent seat 50 and/or adjacent occupant 60 either prior to or in response to occupant penetration to act as a barrier between the inboard moving occupant 60 and the adjacent seat/occupant. In this manner, the arm 110 can also act as a side curtain to help protect the occupant 60 moving obliquely in the manner D from contacting objects inboard of the occupant.

The arms 110, 120 are inflated and fully deployed prior to the occupant 60 engaging the airbag 70 and, thus, when the occupant 60 moves in the manner D he/she is received in the uninflated volume 130 between the arms. Consequently, further occupant 60 movement in the manner D results in the occupant engaging the arm 110 (and possibly the main portion 100 depending on the severity of the inboard oblique movement). As the occupant 60 thereafter penetrates the airbag 70 the instrument panel 42 and/or adjacent seat 50 and/or adjacent occupant provide a reaction surface such that impacts between the penetrating occupant and airbag are reduced.

Similarly, the arm 120 extends to a position outboard of the occupant 60 and rearward in the vehicle 20 sufficient to help protect the occupant in response to any degree of outboard movement in the direction E. The arm 120 can extend rearward to a position aligned with the occupant's upper torso 64 and/or aligned with the seat back 55. The arm 120 can also rely on, for example, the vehicle side structure 29, e.g., the B-pillar or side 30 door, as a reaction surface. More specifically, the deploying arm 120 can engage the side structure and act as a barrier between the outboard moving occupant 60 and the side structure. In this manner, the arm 120 can also act as a side curtain to help protect the occupant 60 moving obliquely in the manner E from contacting objects outboard of the occupant.

The arms 110, 120 are inflated and fully deployed prior to the occupant 60 engaging the airbag 70 and, thus, when the occupant 60 moves in the manner E he/she is received in the uninflated volume 130 between the arms. Consequently, further occupant 60 movement in the manner E results in the occupant engaging the arm 120 (and possibly the main portion 100 depending on the severity of the outboard oblique movement). As the occupant 60 thereafter penetrates the airbag 70 the instrument panel 42 and/or side structure 29 provide a reaction surface such that impacts between the penetrating occupant and airbag are reduced. Consequently, the airbag 70 advantageously helps to protect the occupant 60 in both frontal and oblique vehicle crashes and also act as a side curtain—relying on adjacent vehicle structure and/or occupant(s)—to achieve this end.

It will be appreciated that when the airbag 70 is positioned in the steering wheel 49 and deploys therefrom, the arms 110, 120 similarly deploy to opposite sides of the occupant/operator and rely on the adjacent vehicle structure, e.g., the adjacent passenger seat 50, any occupant therein or the driver-side structure 29 to help protect the driver occupant 60 during frontal and oblique vehicle crashes. Moreover, it will be appreciated that the airbag shown and described herein can be implemented in additional locations in the vehicle, such as in the seat back 55 of the front row 52 in order to provide protection for occupants 60 in the rear row 54.

The airbag of the present invention is advantageous in that it can help afford protection to vehicle occupants in a wide range of crash scenarios, e.g., frontal and oblique, and occupant positions. To this end, due to the extent of the rearward deployment of the arms the position of the occupant's seat relative to the instrumental panel may not negatively affect the ability of the airbag to accommodate occupant movement in response to a vehicle crash. In particular, occupants whose legs are longer and therefore require a seat position further back from the instrumental panel can still be accommodated between the arms of the deployed airbag of the present invention.

Moreover, due to the position and rearward length of the arms the deployed arms can act as side curtains to help prevent impacts between the occupant and adjacent occupants, adjacent seats, and/or adjacent vehicle side structure.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

I claim:

1. A restraint system for helping to protect an occupant in a seat of a vehicle, comprising:
   an airbag inflatable rearward in the vehicle away from an instrument panel, the airbag comprising:
   an inflatable main portion comprising a front panel and a rear panel that define an inflatable volume of the main portion configured to be positioned, when inflated, to be centrally positioned in front of and frontally aligned with the occupant when in a normally seated position in the vehicle seat;
   an inflatable first arm configured to extend from the main portion obliquely rearward and inboard from the main portion to a position that is laterally adjacent an upper torso of the occupant when in the normally seated position, and between the occupant and an adjacent seat of the vehicle;
   an inflatable second arm configured to extend from the main portion obliquely rearward and outboard from the main portion to a position that is laterally adjacent the upper torso of the occupant when in the normally seated position, and between the occupant and an adjacent side structure of the vehicle;
   wherein the first and second arms converge and meet each other at the center of the main portion so that the airbag has a substantially V-shaped configuration when viewed from above;
   wherein uninflated volume is defined between the first and second arms, the uninflated volume being configured to receive the occupant moving in response to a frontal or oblique crash, wherein the main portion is configured to cushion the occupant in the event of a frontal crash, the first arm is configured to cushion the occupant in the event of an oblique crash causing inboard occupant movement, and the second arm is configured to cushion the occupant in the event of an oblique crash causing outboard occupant movement.

2. The restraint system recited in claim 1, further comprising tethers provided within the first and second arms for controlling their shapes and positions.

3. The restraint system recited in claim 2, wherein the tethers in each arm extend parallel to each other, are stacked vertically, and are configured to control the inflated depth of the first and second arms.

4. The restraint system recited in claim 1, wherein the arms have a depth in a forward-rearward direction of the vehicle greater than a depth of the main portion.

5. The restraint system recited in claim 1, wherein the arms are inclined in a forward-rearward direction of the vehicle so as to extend rearward and upward from the main portion.

6. The restraint system recited in claim 1, wherein the arms are angled about 90° from one another in an inboard-outboard direction of the vehicle.

7. The restraint system recited in claim 1, wherein the main portion deploys from a steering wheel of the vehicle.

8. The restraint system recited in claim 1, wherein the main portion deploys from an instrument panel of the vehicle.

9. The restraint system recited in claim 1, wherein at least one of the arms is configured to utilize vehicle structure as a reaction surface for restraining movement of the airbag in response to occupant penetration into the airbag.

10. The restraint system recited in claim 9, wherein the vehicle structure is a door.

11. The restraint system recited in claim 1, further comprising:
a sensor for sensing the occurrence of an event for which deployment of the airbag is desired and producing a signal indicative thereof; and
a controller connected to the sensor and, in response to receiving the signal, actuating an inflator to inflate the airbag to the deployed condition.

12. The restraint system recited in claim 1, wherein:
the first arm has a first end connected to the main portion and a second end forming a distal end of the first arm, wherein the second end of the first arm is configured to be positioned rearward and inboard of the main portion when inflated and deployed; and
the second arm has a first end connected to the main portion and a second end forming a distal end of the first arm, wherein the second end of the second arm is configured to be positioned rearward and outboard of the main portion when inflated and deployed.

13. The restraint system recited in claim 1, wherein the second arm is configured to function as a curtain airbag for protecting the occupant in the event of a side impact crash.

14. The restraint system recited in claim 1, wherein the first and second arms are configured to extend to adjacent a seat back of the vehicle seat.

15. The restraint system recited in claim 1, wherein the first and second arms are configured to extend rearward in the vehicle to a position above an intersection of a seat base and a seat back of the vehicle seat.

16. A restraint system for helping to protect an occupant of a vehicle including a seat with a seat base and a seat back, comprising:
an airbag inflatable rearward in the vehicle away from an instrument panel, the airbag comprising:
an inflatable main portion comprising a front panel and a rear panel that define an inflatable volume of the main portion configured to be positioned, when inflated, centrally in front of and frontally aligned with the seat base and seat back;
an inflatable first arm configured to extend from the main portion obliquely rearward and inboard from the main portion between the occupant and an adjacent seat of the vehicle, wherein the first arm extends the depth of the seat base to a position above a junction with the seat back and has a height configured to cover the occupant's torso;
an inflatable second arm configured to extend from the main portion obliquely rearward and outboard from the main portion between the occupant and an adjacent side structure of the vehicle, wherein the second arm extends the depth of the seat base to a position above the junction with the seat back and has a height configured to cover the occupant's torso, wherein the first and second arms converge and meet each other at the center of the main portion so that the airbag has a substantially V-shaped configuration when viewed from above.

17. The restraint system recited in claim 16, wherein the arms are inclined in a forward-rearward direction of the vehicle so as to extend rearward and upward from the main portion.

18. The restraint system recited in claim 16, wherein the arms are angled about 90° from one another in an inboard-outboard direction of the vehicle.

19. The restraint system recited in claim 16, wherein the main portion deploys from an instrument panel of the vehicle.

20. The restraint system recited in claim 16, further comprising:
a sensor for sensing the occurrence of an event for which deployment of the airbag is desired and producing a signal indicative thereof; and
a controller connected to the sensor and, in response to receiving the signal, actuating an inflator to inflate the airbag to the deployed condition.

21. The restraint system recited in claim 16, wherein the first arm, when inflated, is configured to be positioned laterally adjacent an upper torso of the occupant when in a normally seated position;
wherein the second arm, when inflated, is configured to be positioned laterally adjacent the upper torso of the occupant when in the normally seated position, and between the occupant and an adjacent side structure of the vehicle.

22. The restraint system recited in claim 16, wherein uninflated volume is defined between the first and second arms, the uninflated volume being configured to receive the occupant moving in response to a frontal or oblique crash, wherein the main portion is configured to cushion the occupant in the event of a frontal crash, the first arm is configured to cushion the occupant in the event of an oblique crash causing inboard occupant movement, and the second arm is configured to cushion the occupant in the event of an oblique crash causing outboard occupant movement.

23. The restraint system recited in claim 16, further comprising tethers configured to control the inflated depth of the first and second arms, wherein the tethers in each arm extend parallel to each other and are stacked vertically.

24. The restraint system recited in claim 16, wherein the second arm is configured to function as a curtain airbag for protecting the occupant in the event of a side impact crash.

* * * * *